July 29, 1952     G. D. FORBES     2,605,409
PULSE NARROWING CIRCUIT
Filed March 27, 1946
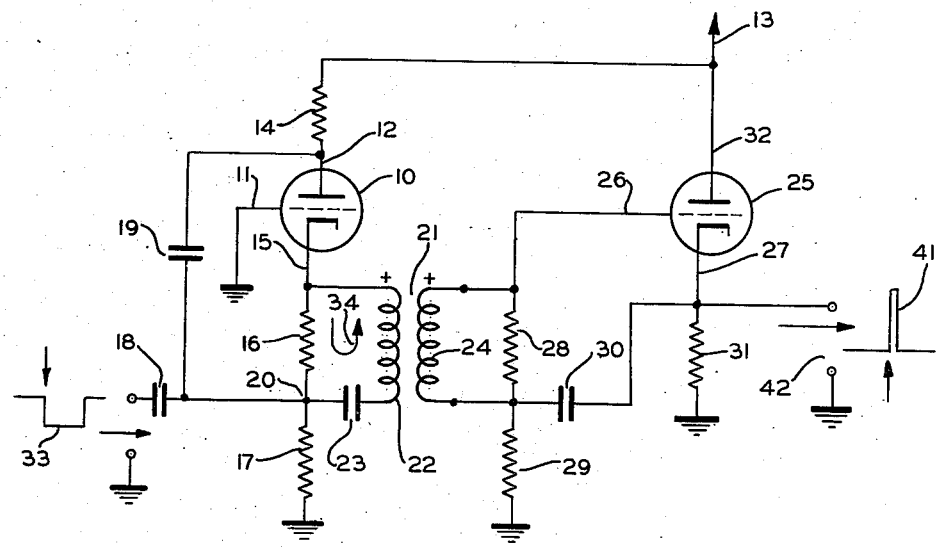
INVENTOR
G. DONALD FORBES
BY *M. O. Hayes*
ATTORNEY

Patented July 29, 1952

2,605,409

UNITED STATES PATENT OFFICE 2,605,409

PULSE NARROWING CIRCUIT

Gordon Donald Forbes, Cambridge, Mass., assignor, by mesne assignments, to the United States of America as represented by the Secretary of the Navy Application March 27, 1946, Serial No. 657,389

10 Claims. (Cl. 250—27)

1

This invention relates to pulse forming circuits and more particularly to circuits adapted to generate a voltage pulse of short time duration corresponding in time to the leading edge of an applied comparatively long duration voltage pulse.

It is often desired to generate a D.-C. pulse of approximately one-tenth microsecond duration from the leading edge of a radar video pulse echo which itself may range in duration from a fraction of microsecond to several microseconds. A video pulse is here construed to be a unidirectional pulse voltage which upon analysis shows an extremely wide spectrum of frequency components.

An application of a pulse forming circuit of the type herein described is in connection with automatic range tracking circuits as employed in the field of radar. In such systems, it is desired that a range tracking gate of special shape be locked by means of associated circuits on a chosen radar video echo. The range of this echo can then be determined by noting the time position of the tracking gate.

The manner in which the tracking gate locks on a specific radar echo is determined to a considerable extent by the shape of the echo envelope, which in the case of large targets, is dependent upon the orientation of the target relative to the radar beam. By employing apparatus of the present invention to form a uniform pulse corresponding to the leading edge of the target video echo, the range tracking circuits will always lock reliably on the front of a target regardless of its changes in radar aspect, and radar range tracking information will be thereby improved.

The circuit of the present invention is particularly adapted to receive large negative video pulses without loading the source thereof and to produce from the leading edge of such pulses sharp, short duration, positive signals by a means having a low output impedance. The circuit includes a minimum of tubes and other elements which draw a low quiescent current.

A primary object of the present invention is to provide means for forming short duration pulses corresponding in time to the leading edges of comparatively long duration voltage pulses.

Another object is to provide means for improving the accuracy of radar automatic range tracking.

A further object is to provide a pulse forming circuit adapted to receive large negative pulses without loading the source thereof.

Another object is to provide a pulse forming

2 circuit having few components and low quiescent current drain.

A still further object is to provide a pulse forming circuit having a low output impedance.

These and other objects will be apparent from the following specification and its accompanying drawing which shows a circuit diagram of one form of apparatus of the present invention.

Referring now to the figure, a first triode stage 10 is shown having a grounded grid 11, a plate 12 returned to terminal 13 of a positive voltage supply through load resistor 14, and a cathode 15 returned to ground through resistors 16 and 17 in series. Capacitor 18 is an input coupling capacitor, while capacitor 19 provides an A.-C. low impedance path from the plate 12 of stage 10 to the junction point 20 of cathode resistors 16 and 17. The primary winding 22 of air core transformer 21 and capacitor 23 in series therewith are connected across resistor 16, providing an output circuit for stage 10.

The secondary winding 24 of transformer 21 applies an input voltage between grid 26 and cathode 27 of the second triode stage 25 which is connected as a cathode loaded "bootstrap" amplifier. Resistor 28 is connected directly across transformer winding 24, one terminal of which is returned to ground through the resistor 29. Coupling capacitor 30 provides D.-C. isolation between the grid and cathode circuits of stage 25, and the cathode 27 of that stage is returned to ground through load resistor 31. Plate 32 is tied directly to the positive voltage supply terminal 13. A grounded grid stage, energized as shown, permits the application of large negative signals with low quiescent current, but such stages ordinarily present the difficulty of low input impedance, which in turn causes undesired high current loading of the input signal source. In the circuit shown in the figure, the input impedance of stage 10 is appreciably increased by the positive feedback coupling introduced by capacitor 19.

For example, assume 50,000 ohms to be a representative value for each of resistors 14 and 17; then the input impedance of stage 10 with A.-C. bypass condenser 19 may be shown to be effectively 25,000 ohms. This is in contrast to the usual input impedance of $$\frac{1}{g_m}$$

($g_m$ being the stage 10 transconductance) of a conventional grounded grid stage, amounting to only a few hundred ohms.

The cathode circuit of stage 10 is a peaking circuit which develops the desired sharp, short duration pulse from the negative input signal 33. On application of this signal a pulse of current is caused to flow in resistor 16 and primary transformer winding 22 in the direction indicated by arrow 34, charging small capacitor 23. This rapid change in transformer primary current induces a sharply rising positive voltage in secondary winding 24 which voltage falls to zero at the time that capacitor 23 is fully charged (primary current zero). The secondary voltage then reverses as the transformer flux collapses.

The time width of the positive pulse output of secondary winding 24 is thus a direct function of the size of capacitor 23. An air core coupling transformer 21 is preferably employed to maintain a small transient time constant. The voltage reversal following the desired sharp positive output pulse does not affect operation of the subsequent stage 25, for reasons to be discussed hereinbelow.

To further lower the quiescent current of the circuits shown and to obtain a positive pulse output, stage 25 is cathode loaded (resistor 31), with the positive pulse output of transformer secondary winding 24 coupled to the grid 26 of this stage. Since the secondary winding 24 is essentially above ground, stage 25 is operated as a high gain cathode loaded "bootstrap" amplifier with winding 24 connected between grid 26 and cathode 27.

Stage 25 connected as shown in the figure offers a low input impedance to match the low driving impedance of the transformer 21. In addition, this cathode loaded stage has a low output impedance, and its cathode resistor is made small thereby providing the low transient time constant required to accommodate the output pulse 34 which is of the order of one-tenth microsecond in duration.

Resistor 28 in parallel with the grid to cathode impedance of stage 25 forms the termination of transformer 21. Resistor 29 is a grid current limiting resistor which also serves to place secondary transformer winding 24 effectively above ground potential. Capacitor 30 couples the transformer output pulse to the input of stage 25 and isolates the grid and cathode circuit direct currents of that stage.

Under quiescent conditions, the output of transformer 21 is zero, and a bias voltage is developed in cathode resistor 31 which holds stage 25 nearly at cut off. The positive pulse from the transformer produces the positive output pulse 41 at output terminals 42. Negative overshoot previously mentioned does not appear in the output as it drives stage 25 below cut off.

When employing the pulse forming circuit of the present invention in automatic range tracking apparatus as set forth above, the negative input signal 33 of the figure comprises the negative video echo being tracked, which echo is selected from all other video echoes by a conventional narrow movable range gate system. The output signal 34 is fed directly to the conventional range tracking circuits.

The invention described in the foregoing specification need not be limited to the details shown which are included herein chiefly for illustrative purposes.

What is claimed is:

1. Apparatus for producing a short duration voltage pulse corresponding in time to the leading edge of a comparatively long duration voltage pulse, said apparatus comprising a triode grounded grid stage, electrical loads in the plate and cathode circuits thereof, said long duration pulse being applied to said cathode circuit, a transformer having a primary winding connected across a portion of said cathode load, a capacitor connected between the plate of said grounded grid stage and said primary winding, the secondary winding of said transformer being coupled between the grid and cathode of a cathode loaded amplifier, said short time duration pulse being taken from the cathode circuit of said last mentioned amplifier.

2. Apparatus as set forth in claim 1 wherein the primary and secondary windings of said transformer are coupled through an air core, a comparatively small capacitor being connected in series with said primary winding, and a comparatively small resistor comprising the load in said cathode circuit of said cathode loaded amplifier.

3. Apparatus for producing a short duration pulse corresponding in time to the leading edge of a comparatively long duration voltage pulse, said apparatus comprising an electron tube amplifier stage including an electron tube having at least an anode and a cathode, first and second load impedances coupled to the cathode and anode, respectively, of said electron tube, a peaking circuit coupled at its input to said cathode, an input circuit coupled to said peaking circuit, and positive feedback means coupled between said anode and said peaking circuit for substantially increasing the input impedance of said apparatus as measured at said input circuit.

4. Apparatus as in claim 3 and a cathode loaded amplifier coupled to the output of said peaking circuit.

5. Apparatus for producing a short time duration voltage pulse comprising, a reference potential source, an electron tube having at least an anode, a control grid returned to said reference potential source, and a cathode, a peaking circuit coupled at its input to said cathode, an input circuit coupled to said peaking circuit, a cathode loaded amplifier coupled to the output of said peaking circuit and a capacitor coupled at one plate to said anode and coupled at its other plate to said peaking circuit for increasing substantially the impedance of said apparatus as measured at said input circuit.

6. Apparatus for producing a short duration voltage pulse corresponding in time to the leading edge of a comparatively long duration voltage pulse, said apparatus comprising, a reference potential source, an electron tube having at least an anode, a control grid coupled directly to said reference potential source, and a cathode, a peaking transformer coupled at its primary winding to said cathode, an input circuit coupled to said primary winding, a cathode loaded amplifier coupled to the secondary winding of said peaking transformer, and a capacitor connected at one of its plates to said anode and coupled at its other plate to said primary winding of said peaking transformer for increasing substantially the input impedance of said apparatus as measured at said input circuit.

7. Apparatus for producing a short duration voltage pulse corresponding in time to the leading edge of a comparatively long duration voltage pulse, said apparatus comprising, a source of reference potential, a triode having at least an anode, a control grid coupled directly to said reference potential source, and a cathode, an anode circuit including a load coupled to said anode, a cathode circuit including a load coupled to said cathode, means for coupling an applied input signal to said cathode circuit, a transformer having a primary winding coupled across a portion of said cathode load, a cathode loaded amplifier including a second electron tube, said second electron tube including a control grid and a cathode, said transformer having a secondary winding coupled between said control grid and said cathode of said second electron tube, and means for abstracting any output signal appearing between said cathode of said second electron tube and said reference potential source.

8. Apparatus for producing a short duration voltage pulse corresponding in time to the leading edge of a comparatively long duration voltage pulse, said apparatus comprising, a source of reference potential, a first electron tube having at least an anode, a control grid connected directly to said reference potential source, and a cathode, a first resistor connected at one terminal to said anode and at its other terminal to a source of potential that is positive with respect to said reference potential, second and third resistors serially connected between said cathode and said reference potential source, a first capacitor connected between the junction of said second and third resistors and said anode, a second capacitor connected at one terminal to said junction of said second and third resistors, means for coupling an applied signal between the other terminal of said second capacitor and said reference potential source, a peaking transformer having primary and secondary windings, a third capacitor, said primary winding and said third capacitor being serially connected between said cathode and said junction of said second and third resistors, a second electron tube having at least an anode, a control grid and a cathode, a fourth resistor connected between the cathode of said second tube and said reference potential source, means connecting said anode of said second tube to said positive potential source, fifth and sixth resistors serially connected between said grid of said second tube and said reference potential source, said secondary winding being connected between said grid of said second tube and said junction of said fifth and sixth resistors, a fourth capacitor connected between said junction of said fifth and sixth resistors and said cathode of said second tube, and means for abstracting any signal appearing across said fourth resistor.

9. Apparatus for producing a short duration pulse corresponding in time to the leading edge of a comparatively long duration voltage pulse, said apparatus comprising an amplifier stage including an electron tube having at least an anode, a cathode and a control grid, a source of reference potential, said control grid being connected directly to said reference potential source, first and second load impedances coupled to the cathode and anode of said tube, respectively, a peaking circuit coupled at its input to said cathode, an input circuit coupled to said peaking circuit, and positive feedback means coupled between said anode and said peaking circuit for substantially increasing the input impedance of said apparatus.

10. Apparatus for producing a short time duration voltage pulse comprising, a reference potential source, an electron tube having at least an anode, a control grid connected directly to said reference potential source, and a cathode, a peaking circuit coupled at its input to said cathode, an input circuit coupled to said peaking circuit, a cathode loaded amplifier coupled to the output of said peaking circuit, and a capacitor coupled at one terminal to said anode and coupled at its other terminal to said peaking circuit for increasing substantially the input impedance of said apparatus.

G. DONALD FORBES.

REFERENCES CITED

The following references are of record in the file of this patent:

UNITED STATES PATENTS

| Number | Name | Date |
|---|---|---|
| 2,367,940 | Gulliksen | Jan. 23, 1940 |
| 2,421,025 | Grieg | May 27, 1947 |
| 2,426,256 | Zenor | Aug. 26, 1947 |
| 2,496,723 | Hipple | Feb. 7, 1950 |